(12) United States Patent
VedBrat et al.

(10) Patent No.: US 8,122,376 B2
(45) Date of Patent: *Feb. 21, 2012

(54) MANIPULATING TOOLBAR COMPONENT DIMENSIONS

(75) Inventors: Kanwal VedBrat, Seattle, WA (US); Jingyang Xu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 796 days.

This patent is subject to a terminal disclaimer.

(21) Appl. No.: 12/142,679

(22) Filed: Jun. 19, 2008

(65) Prior Publication Data

US 2008/0250351 A1    Oct. 9, 2008

Related U.S. Application Data

(63) Continuation of application No. 10/464,257, filed on Jun. 17, 2003, now Pat. No. 7,409,646.

(51) Int. Cl.
*G06F 3/048* (2006.01)
(52) U.S. Cl. ........................................ 715/815; 715/845
(58) Field of Classification Search .................. 715/815, 715/845
See application file for complete search history.

(56) References Cited

U.S. PATENT DOCUMENTS

| | | | |
|---|---|---|---|
| 6,057,836 A | 5/2000 | Kavalam et al. | |
| 6,072,486 A | 6/2000 | Sheldon et al. | |
| 6,133,915 A | 10/2000 | Arcuri et al. | |
| 6,232,972 B1 | 5/2001 | Arcuri et al. | |
| 6,278,450 B1 | 8/2001 | Arcuri et al. | |
| 6,426,761 B1 | 7/2002 | Kanevsky et al. | |
| 6,433,801 B1 | 8/2002 | Moon et al. | |
| 6,563,514 B1 | 5/2003 | Samar | |
| 6,624,831 B1 | 9/2003 | Shahine et al. | |
| 6,704,031 B1 | 3/2004 | Kimball et al. | |
| 6,727,919 B1 | 4/2004 | Reder et al. | |
| 6,857,105 B1 | 2/2005 | Fox et al. | |
| 6,883,143 B2 | 4/2005 | Driskell | |
| 6,918,091 B2 | 7/2005 | Leavitt et al. | |
| 7,036,087 B1 | 4/2006 | Odom | |
| 7,039,875 B2 | 5/2006 | Khalfay et al. | |
| 7,409,646 B2 * | 8/2008 | VedBrat et al. | 715/815 |
| 2004/0218451 A1 | 11/2004 | Said et al. | |
| 2005/0039144 A1 | 2/2005 | Wada et al. | |
| 2007/0005413 A1 | 1/2007 | Hennings et al. | |

* cited by examiner

*Primary Examiner* — William Bashore
*Assistant Examiner* — David Phantana Angkool
(74) *Attorney, Agent, or Firm* — Shook Hardy & Bacon L.L.P.

(57) ABSTRACT

Systems and methods for manipulating toolbar dimensions are provided. Each toolbar includes a number of toolbar components each having a first and second representation and the toolbar is associated with a reference value. As the toolbar dimensions are adjusted, if the reference value for the toolbar is between a first and second size thresholds, the toolbar is adjusted and displayed relative to the reference value while maintaining the relative position of the toolbar components displaying a first representation to each other. Alternatively, if the reference value for the toolbar is not between the first and second size thresholds, the toolbar is adjusted and displayed relative to the reference value while maintaining the relative position of the toolbar components displaying a second representation to each other.

17 Claims, 9 Drawing Sheets

MANIPULATING TOOLBAR COMPONENT DIMENSIONS

BACKGROUND

Generally described, computing devices can be utilized to display images and provide functionality to computer users on a display screen. In one common embodiment, the functionality provided by the computer is embodied in the form of a graphical user interface in which software applications are displayed within rectangular windows. Each rectangular window corresponding to a particular application can include multiple portions designed to provide a user with different functionality. For example, a word processing software application may have a primary display section to manipulate/read text and graphics. The word processing application may also include a toolbar section, such as at the top of the display, that allows the user to implement various functions provided by the software application.

In one commonly known embodiment, the toolbar section includes a number of individual components that correspond to a particular function for the software application. In one aspect, each toolbar component can be represented in a graphical form, such as a graphical icon illustrative of the function represented by the individual component. In another aspect, each toolbar component can be represented in a textual form, such as keywords illustrative of the function represented by the individual component. In another aspect, each toolbar component can be represented in both a graphical and textual form. In many embodiments, a user may be allowed to select one of the three forms of representing toolbar components.

In one common embodiment, the dimensions of the toolbar and the toolbar components are typically fixed. Generally, the dimensions of the toolbar are selected in manner that allows the toolbar components to be distinguishable to the user. However, one skilled in the relevant art will appreciate that the size of a display screen available to display the toolbar component can vary greatly. For example, the display screen available for a large, flat panel display will vary greatly from the display screen available for a personal digital assistant. In addition to display size limitations, some users may have different needs/preferences for the dimensions of the toolbar. Accordingly, a fixed dimension toolbar is not preferred for various software applications.

One attempt to overcome the deficiencies associated with a fixed dimension toolbar involves the use of a graphical control to allow a user to vary the dimension of the toolbar. As a user manipulates a selection device, such as a mouse, the toolbar dimensions, and the size of the textual and/or graphical components within the toolbar components, vary according to the movement of the selection device. However for embodiments utilizing textual and graphical representations, varying the dimension of the toolbar components can yield varying results. If the overall dimension of each toolbar component is sufficiently large, varying the size of textual and graphical representations within the components can be satisfactory. However, as the dimensions of the toolbar component decrease, the dimensions of the textual and graphical representations become sufficiently small to diminish the value of an adjustable toolbar. Accordingly, the user must select to use either the graphical representation and/or the textual representation. This process can be time consuming and inefficient.

Thus, there is a need for a system and method for manipulating the dimensions of toolbar components having graphical and textual representations.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A system and method for manipulating toolbar dimensions are provided. Each toolbar includes a number of toolbar components having a textual representation and a graphic representation. As the toolbar dimensions are adjusted, a first size threshold defines when to adjust the graphic representation while maintaining the textual representation, a second size threshold defines when to omit the textual representation and adjust the graphic representation and a third size threshold determines when to omit the graphic representation and fix the textual representation.

In accordance with an aspect of the present invention, a method for manipulating the dimensions of a toolbar is provided. The method may be implemented in a computer system including a display and at least one user input device. The toolbar includes one or more toolbar components including a graphical representation and a textual representation. Additionally, the toolbar is associated with at least one reference attribute. In accordance with the method, a device obtains user input corresponding to a manipulation of the dimensions of the toolbar and a current reference attribute value for the toolbar. If the current reference attribute value for the toolbar is between a maximum size threshold and a first threshold, the device adjusts the dimensions of the graphical representation of each toolbar component relative to the user input. If the current reference attribute value for the toolbar is between the first threshold and a second threshold, the device adjusts the dimensions of the graphical representation of each toolbar component relative to the user input. Additionally, if the current reference attribute value for the toolbar is between the second threshold and a base threshold, the device fixes the dimensions of the textual representation of each toolbar component relative to the user input.

In accordance with another aspect of the present invention, a method for manipulating the dimensions of a toolbar is provided. The method may be implemented in a computer system including a display and at least one user input device. The toolbar includes one or more toolbar components including a first representation and a second representation. Additionally, the toolbar is associated with at least one reference attribute. In accordance with the method, a device obtains user input corresponding to a manipulation of the dimensions of the toolbar and a current reference attribute value for the toolbar. If the current reference attribute value for the toolbar is between a first size threshold and a second size threshold, the device adjusts the dimensions of the first representation of each toolbar component relative to the user input. If the current reference attribute value for the toolbar is between the first size threshold and a second size threshold, the device adjusts the dimensions of the second representation of each toolbar component relative to the user input.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, the present invention relates to a system and method for optimizing dynamically adjusting the dimensions of toolbar components. More specifically, the present invention relates to a system and method for dynamically modifying the dimensions of toolbar components and toolbar presentation utilizing multiple size thresholds. Although the present invention may be described with regard to illustrative threshold values and/or operating environments, one skilled in the relevant art will appreciate that these embodiments should not be construed as limiting. Prior to discussing the present invention in greater detail, a suitable computing system for implementing the present invention will be described.

Figure 10:
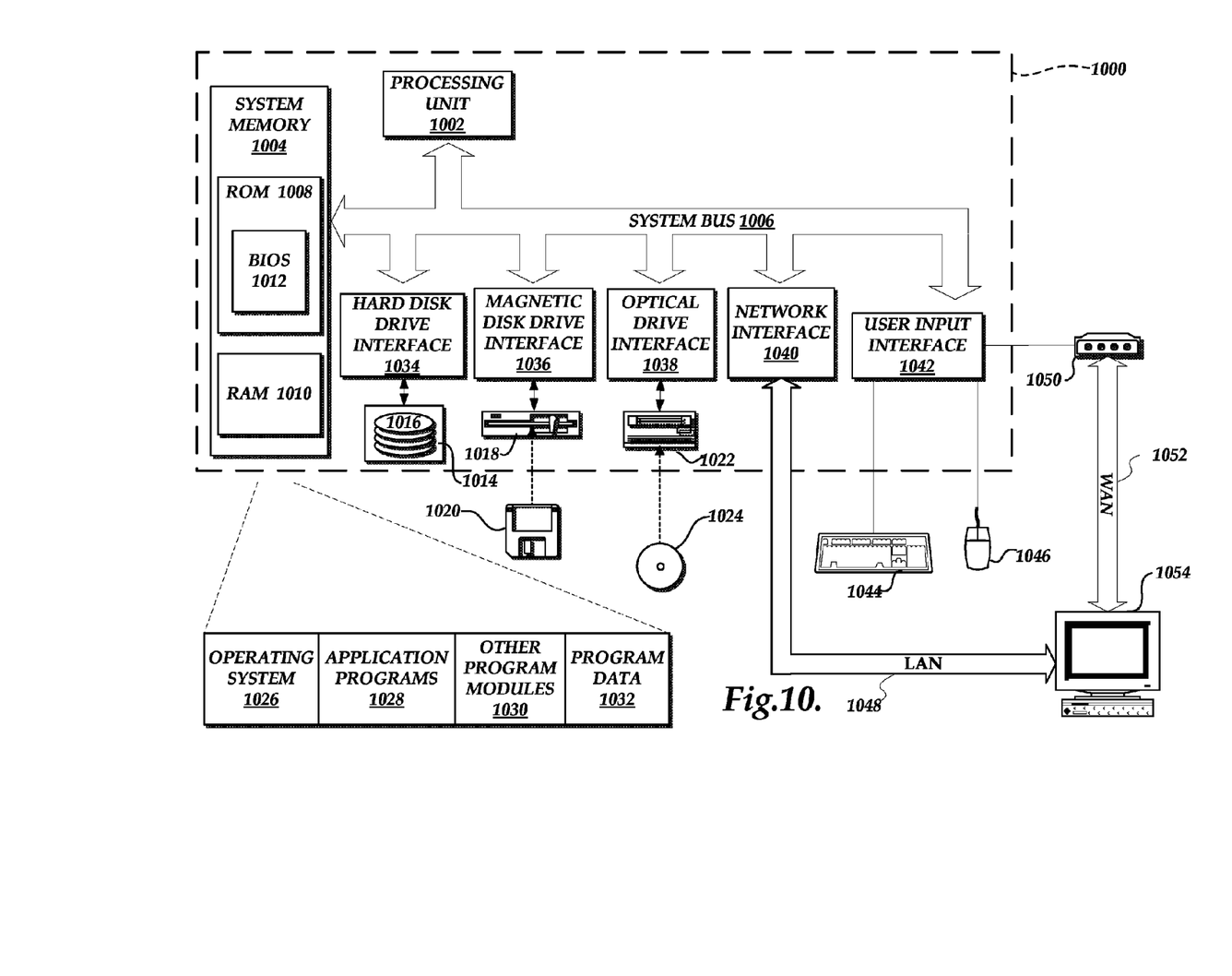
FIG. 10 is a block diagram illustrative of a computer system suitable to implement various aspects of the present invention.

FIG. 10 illustrates an example of a suitable computing system environment in which the invention may be implemented. The computing system environment is only one example of a suitable computing environment and is not intended to suggest any limitation as to the scope of use or functionality of the invention. Neither should the computing environment be interpreted as having any dependent requirement relating to any one or combination of components illustrated in the exemplary operating environment.

The invention is operational in numerous other general purpose or special computing system environments or configurations. Examples of well known computing systems, environments, and/or configurations that may be suitable for implementing the invention include, but are not limited to, personal computers, server computers, laptop devices, multiprocessor systems, microprocessor-based systems, network PCs, minicomputers, mainframe computers, or distributed computing environments that include any of the above systems or the like.

The invention may be described in the general context of computer-executable instructions, such as program modules, being executed by a computer. Generally, program modules include routines, programs, objects, components, data structures, etc., that perform a particular task or implement particular abstract data types. The invention may be also practiced in distributed computing environments where tasks are performed by remote processing devices that are linked through a communications network. In a distributed computing environment, program modules may be located in both local and remote computer storage media including memory storage devices.

With reference to FIG. 10, an exemplary system for implementing the invention includes a general purpose computing device in the form of a computer 1000. Components of a computer 1000 include, but are not limited to, a processing unit 1002, a system memory 1004, and a system bus 1006 that couples various system components including the system memory to the processor. The system bus may be any of several types of bus structures including a memory bus or memory controller, peripheral bus, and a local bus using any of a variety of bus architectures. By way of example, not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as a Mezzanine bus.

The computer 1000 typically includes a variety of computer-readable media. Computer-readable media can be any available media that can be accessed by the computer 1000 and includes both volatile and non-volatile media, removable and non-removable media. By way of example, and not limitation, computer-readable media may comprise computer storage media and communication media. Computer storage media includes, but is not limited to, RAM, ROM, EEPROM, flash memory or other memory technology, CD-ROM, Digital Versatile Disk (DVD) or other optical disk storage, magnetic cassettes, magnetic tape, magnetic disk storage or other magnetic storage devices, or any other medium which can be used to store the desired information and which can be accessed by the computer 1000.

The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 1004 includes computer storage media in the form of volatile and/or non-volatile memory such as read only memory (ROM) 1008 and random access memory (RAM) 1010. A basic input/output system 1012 (BIOS), containing the basic routines that help to transfer information between elements within the computer 1000, such as during start-up, is typically stored in ROM 1008. RAM 1010 typically contains data and/or program modules that are immediately accessible to and/or presently being operated on by the processing unit 1002. By way of example, and not limitation, FIG. 10 illustrates an operating system 1026, application programs 1028, other program modules 1030, and program data 1032.

The computer 1000 may also include removable/non-removable, volatile/non-volatile computer storage media. By way of example only, FIG. 10 illustrates a hard disk drive 1014 that reads from or writes to non-removable, non-volatile magnetic media 1016, a magnetic drive 1018 that reads from or writes to a removable, non-volatile magnetic disk 1020, and an optical disk drive 1022 that reads from or writes to a removable, non-volatile optical disk 1024, such as CD-ROM, or other optical media. Other removable/non-removable, volatile/non-volatile computer storage media that can be used in the exemplary operating environment include, but are not limited to, magnetic tape cassettes, flash memory cards, DVD, digital video tape, Bernoulli cap cartridges, solid state RAM, solid state ROM, and the like. The hard disk drive 1014, magnetic disk drive 1018, and optical disk drive 1022 may be connected to the system bus 1006 by a hard disk drive interface 1034, a magnetic disk drive interface 1036, and an optical drive interface 1038, respectively. Alternatively, the hard disk drive 1014, magnetic disk drive 1018, and optical disk drive 1022 are typically connected to the system bus 1006 by a Small Computer System Interface (SCSI).

The drives and their associated computer storage media discussed above and illustrated in FIG. 10, provide storage of computer-readable instructions, data structures, program modules and other data for the computer 1000. In FIG. 10, for example, the hard disk drive 1034 is illustrated as storing the operating system 1026, application programs 1028, other programs 1030, and program data 1032. Note that these components can either be the same as or different from the operating system 1026, the other program modules 1030, and the program data 1032. A user may enter commands and information into the computer 1000 through an input device such as a keyboard 1044 and/or a pointing device 1046, commonly referred to as a mouse, track ball or touch pad. Other input devices (not shown) may include a microphone, a joystick, a game pad, a satellite dish, a scanner, or the like. These and other input devices are often connected to the processing unit 1002 through user input interface 1042 and may be connected by other interface and bus structures, such as a parallel port, game port or other universal serial bus (USB).

The computer 1000 may operate in a network environment using logical connections to one or more remote computers 1054. The remote computer 1054 may be a personal computer, a server, a router, a network PC, a peer device or other common network node, and typically includes many or all of the elements described above relative to the computer 1000, although only a memory storage device has been illustrated in FIG. 10. The logical connections depicted in FIG. 10 include a local area network (LAN) 1048 and a wide area network (WAN) 1052, but also include other networks. Such network environments are commonplace in office, enterprise-wide computer networks, Intranets, and the Internet.

When used in a LAN network environment, the computer 1000 is connected to the LAN 1048 through a network interface adapter 1040. When used in a WAN network environment, the computer typically includes a modem 1050 or other means for establishing communications over the WAN 1052, such as the Internet. The modem, which may be internal or external, may be connected to the system bus 1006 via the serial port interface or other appropriate mechanism. In a networked environment, program modules depicted relative to the computer 1000, or portions thereof, may be stored in the remote memory storage device. By way of example, and not limitation, FIG. 10 illustrates remote application programs 1028 as residing on memory device 1004. It will be appreciated that the network connections shown are exemplary and other means of establishing communication between the computers may be used. Although many other internal components of the computer 1000 are not shown, those of ordinary skill will appreciate that such components and their interconnection are well known. Accordingly, additional details concerning the internal construction of the computer 1000 need not be disclosed in connection with the present invention.

Those skilled in the art will understand that program modules such as the operating system 1026, the application programs 1028 and data 1032 are provided to the computer 1000 via one of its memory storage devices, which may include ROM 1008, RAM 1010, hard disk drive 1014, magnetic disk drive 1018, or optical disk device 1022. The hard disk drive 1014 is used to store data 1032 and the programs, including the operating system 1026 and application programs 1028.

When the computer 1000 is turned on or reset, the BIOS 1012, which is stored in ROM 1008 instructs the processing unit 1002 to load the operating system 1026 from the hard disk drive 1014 into the RAM 1010. Once the operating system 1026 is loaded into RAM 1010, the processing unit executes the operating system code and causes the visual elements associated with the user interface of the operating system to be displayed on the monitor. When a user opens an application program 1028, the program code and relevant data are read from the hard disk drive and stored in RAM 1010.

As described above, aspects of the present invention are embodied in a World Wide Web ("WWW") or ("Web") site accessible via the Internet. As is well known to those skilled in the art, the term "Internet" refers to the collection of networks and routers that use the Transmission Control Protocol/Internet Protocol ("TCP/IP") to communicate with one another. In accordance with an illustrative embodiment of the Internet, a plurality of local LANs and a WAN can be interconnected by routers. The routers are special purpose computers used to interface one LAN or WAN to another. Communication links within the LANs may be wireless, twisted wire pair, coaxial cable, or optical fiber, while communication links between networks may utilize 56 Kbps analog telephone lines, 1 Mbps digital T-1 lines, 45 Mbps T-3 lines or other communications links known to those skilled in the art. Furthermore, computers and other related electronic devices can be remotely connected to either the LANs or the WAN via a digital communication device, modem and temporary telephone, or a wireless link.

As is appreciated by those skilled in the art, the WWW is a vast collection of interconnected or "hypertext" documents written in HyperText Markup Language ("HTML"), or other markup languages, that are electronically stored at or dynamically generated by "WWW sites" or "Web sites" throughout the Internet. Additionally, client-side software programs that communicate over the Web using the TCP/IP protocol are part of the WWW, such as JAVA® applets, instant messaging, e-mail, browser plug-ins, Macromedia Flash, chat and others. Other interactive hypertext environments may include proprietary environments such as those provided by an number of online service providers, as well as the "wireless Web" provided by various wireless networking providers, especially those in the cellular phone industry. It will be appreciated that the present invention could apply in any such interactive communication environments, however, for purposes of discussion, the Web is used as an exemplary interactive hypertext environment with regard to the present invention.

A Web site is a server/computer connected to the Internet that has massive storage capabilities for storing hypertext documents and that runs administrative software for handling requests for those stored hypertext documents as well as dynamically generating hypertext documents. Embedded within a hypertext document are a number of hyperlinks, i.e., highlighted portions of text which link the document to another hypertext document possibly stored at a Web site elsewhere on the Internet. Each hyperlink is assigned a Uniform Resource Locator ("URL") that provides the name of the linked document on a server connected to the Internet. Thus, whenever a hypertext document is retrieved from any web server, the document is considered retrieved from the World Wide Web. Known to those skilled in the art, a web server may also include facilities for storing and transmitting application programs, such as application programs written in the JAVA® programming language from Sun Microsystems, for execution on a remote computer. Likewise, a web server may also include facilities for executing scripts and other application programs on the web server itself.

A remote access user may retrieve hypertext documents from the World Wide Web via a web browser program. A web browser, such as Netscape's NAVIGATOR® or Microsoft's Internet Explorer®, is a software application program for providing a user interface to the WWW. Using the web browser via a remote request, the web browser requests the desired hypertext document from the appropriate web server using the URL for the document and the HyperText Transport Protocol ("HTTP"). HTTP is a higher-level protocol than TCP/IP and is designed specifically for the requirements of the WWW. HTTP runs on top of TCP/IP to transfer hypertext documents and user-supplied form data between server and client computers. The WWW browser may also retrieve programs from the web server, such as JAVA applets, for execution on the client computer. Finally, the WWW browser may include optional software components, called plug-ins, that run specialized functionality within the browser.

As described above, the present invention corresponds to the dynamic modification of toolbar component dimensions and displays utilizing size thresholds. Generally described, the present invention utilizes a three-stage process corresponding to the two size thresholds. In a first stage, each toolbar component includes a graphical representation and a textual representation. As the toolbar dimensions are adjusted, the graphical representations are adjusted in accordance with an adjustment to the toolbar dimensions, while the textual representation remains intact. In a second stage, each toolbar component includes only a graphical component that may be adjusted with an adjustment to the toolbar dimensions. In a third stage, each toolbar component includes only a textual component that remains intact with further adjustments to the toolbar dimensions. By setting size thresholds, each toolbar component transitions to and from each stage dynamically. Although the present invention will be described with regard to toolbar components that have textual and graphical representations, the present invention may be applied to any toolbar components having different types of representations or different number of representations. Further, the present invention may apply to any number of multiple-stage sizing processes. Accordingly, the described embodiments should not be construed as limiting.

Figure 1:
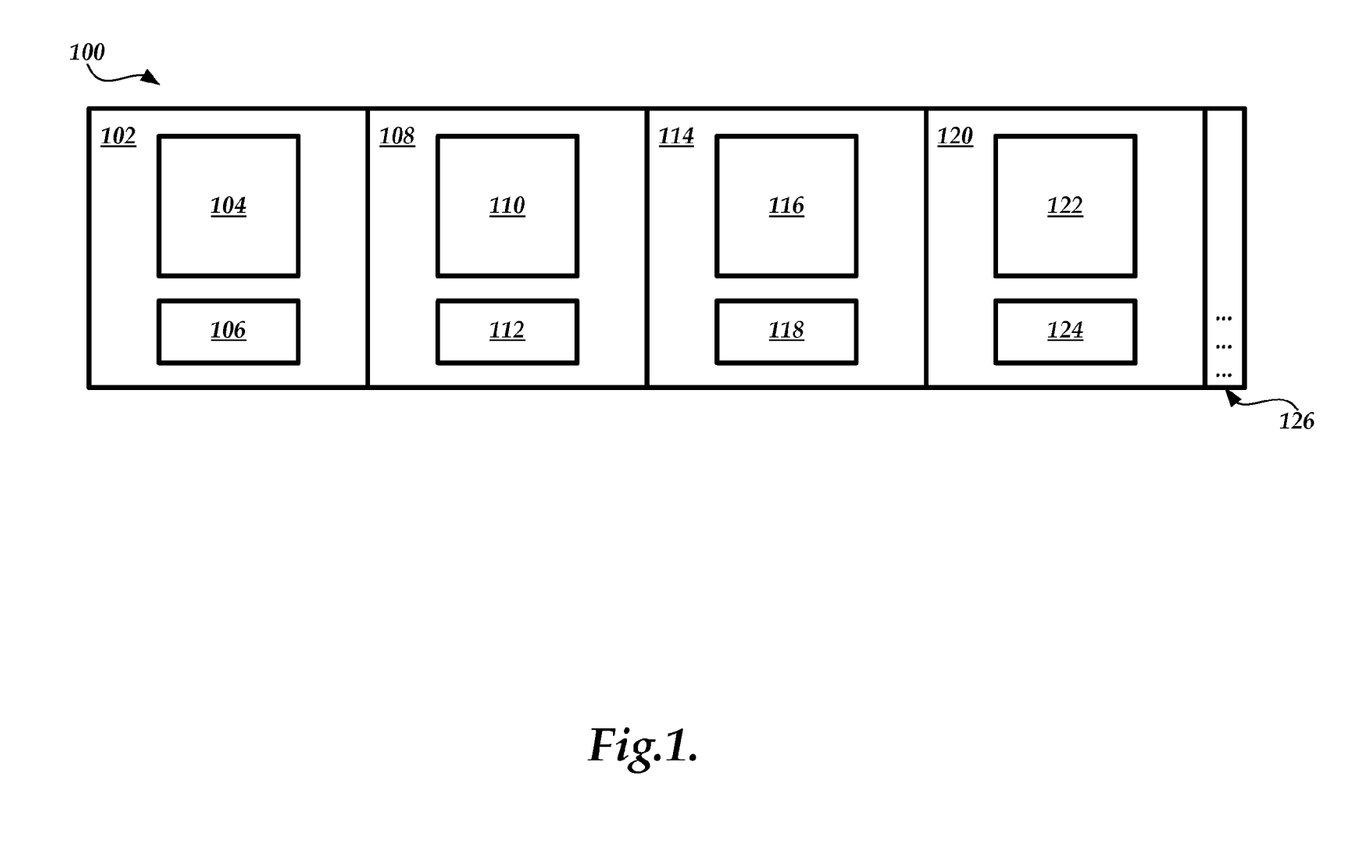
FIG. 1 is a block diagram illustrative of a toolbar including a number of toolbar components, each toolbar component including a graphical representation and a textual representation, and toolbar manipulation control in accordance with the present invention.
Figure 2:
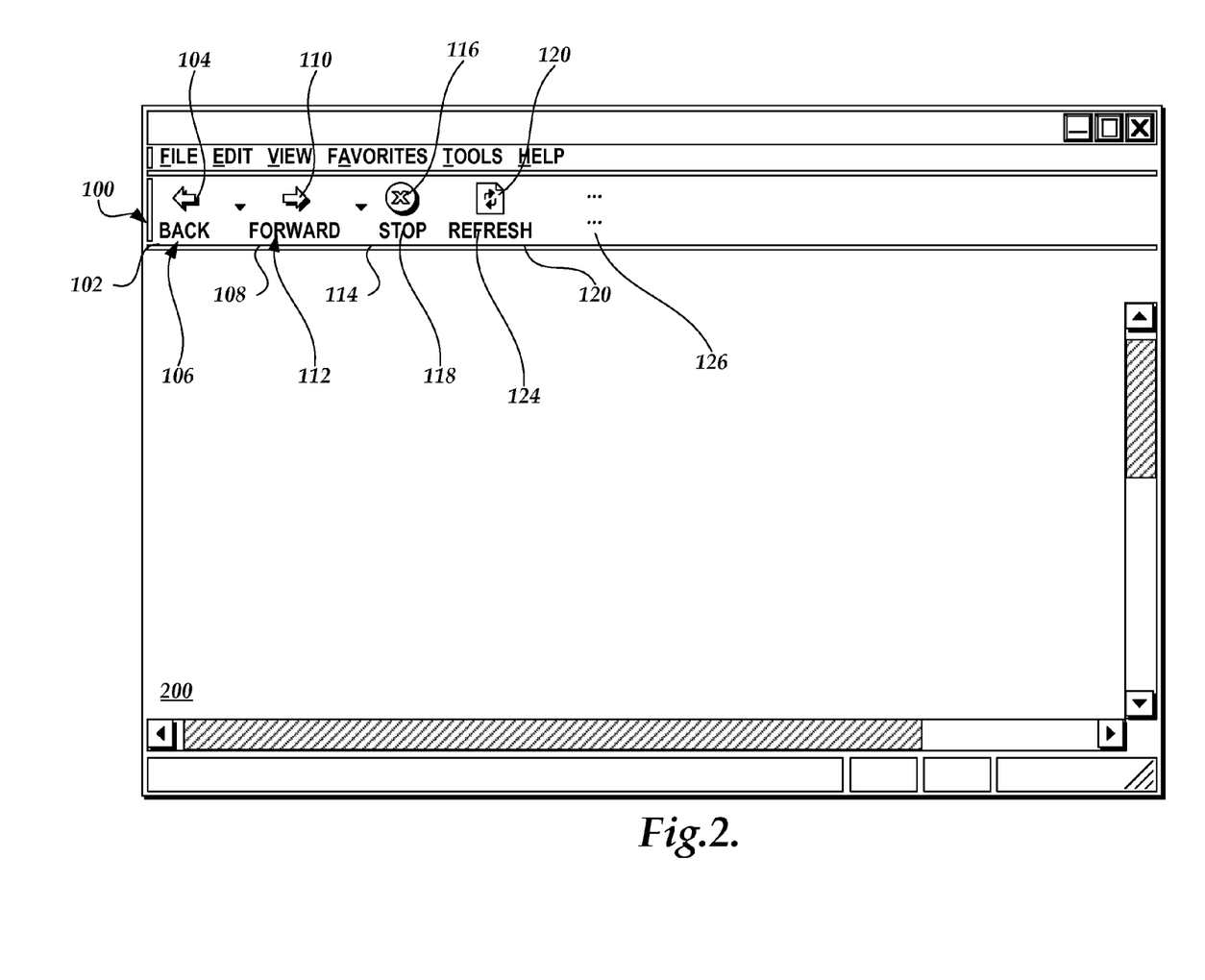
FIG. 2 is a block diagram of a screen display of window including a toolbar in accordance with the present invention.

FIG. 1 is a block diagram illustrative of a toolbar 100 including a number of toolbar components in accordance with the present invention. In accordance with an illustrative embodiment of the present invention, the toolbar includes a number of components 102, 108, 114, 120. Each toolbar component 102, 108, 114, 120 includes two representations for identifying the toolbar component to a user on a display. In an illustrative embodiment of the present invention, each toolbar component can include a graphical representation 104, 110, 116, 122 and a textual representation 106, 112, 118, 124. As illustrated in FIG. 1, the graphical representations 104, 110, 116, 122 are generally larger than the textual representations 106, 112, 118, 124. However, the graphical representations and textual representations may be of any size proportions, including equal in size. Further, although the graphical and textual representations are illustrated as being equal in size for each toolbar component, each graphical and textual representation may have individual dimensions. As also illustrated in FIG. 1, the toolbar 100 also includes a manipulation control 126 for manipulating the dimensions of the toolbar. As will be explained in greater detail below, the manipulation control 126 may manipulated via a user selection device, such as a mouse, pen, stylus, etc., or via a keyboard input device. FIG. 2 is a block diagram of a screen display 200 illustrating the implementation of a toolbar 100 in an application window. However, the toolbar 100 may be implemented in any number of other screen displays or embodiments.

Figure 3A:
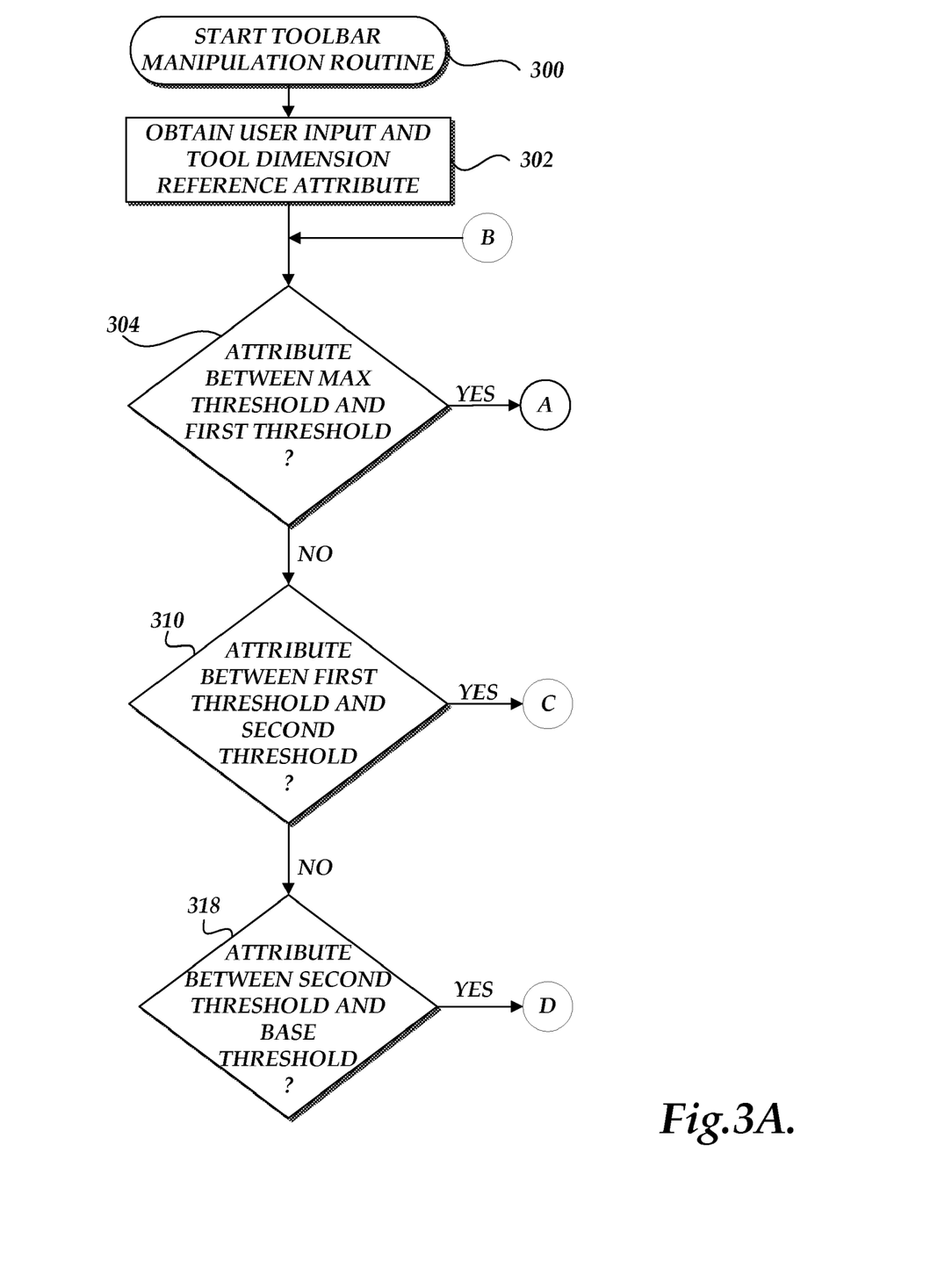
FIGS. 3A, 3B, and 3C are flow diagrams illustrative of a toolbar dimension manipulation routine in accordance with the present invention.
Figure 3B:
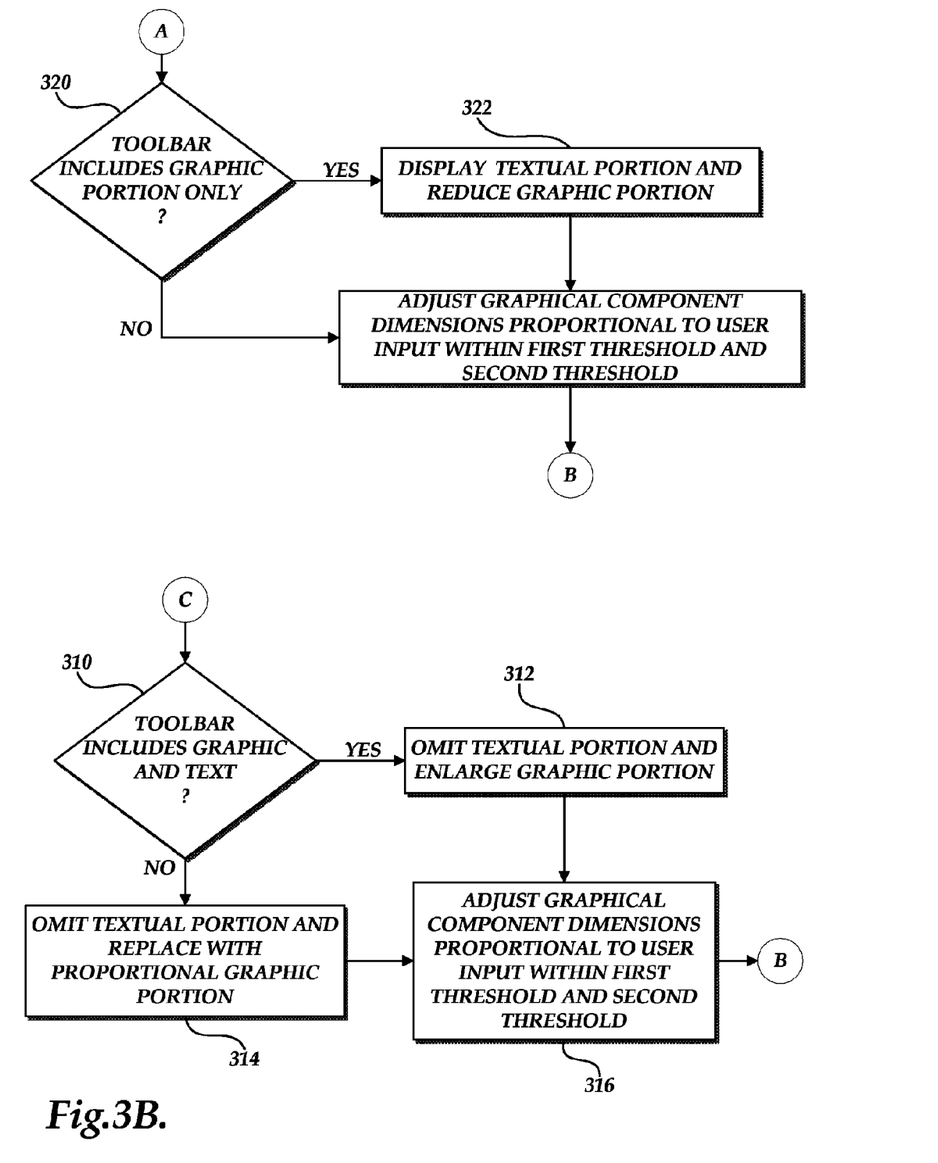

With reference now to FIGS. 3A, 3B and #c a routine 300 for dynamically modifying the dimension and display of the toolbar 100 having toolbar components with a textual representation and a graphical representation. (FIG. 1) will be described. With reference to FIG. 3A, at block 302, a user input manipulating the toolbar 100 is obtained. As described above, the user input can be obtained in a variety of manners. In one embodiment, a user may utilize a selection device to manipulate the toolbar manipulation control 126. In another embodiment, a user may utilize a keyboard to manipulate the toolbar graphically, such as with arrow keys. In a further embodiment, a user may utilize a keyboard to manipulate the toolbar numerically by entering a numerical adjustment. Still further, in another embodiment, a user may manipulate the toolbar indirectly by manipulating the dimension of an object linked to the toolbar 100, such as the dimensions of a screen display window 200 (FIG. 2). In an illustrative embodiment of the present invention, the user manipulation may cause the toolbar 100 to adjust its dimensions in two dimensions (e.g., length and height). The adjustment of the dimensions may be directly proportional. Alternatively, the one of the dimensions may be adjusted at a different rate from the other dimension. In another embodiment, the user manipulation may cause the toolbar 100 to adjust in only a single dimension while maintaining the other dimension.

With continued reference to block 302, a reference attribute value for the toolbar is obtained. In an illustrative embodiment of the present invention, the current toolbar 100 dimension may correspond to one or more attribute dimensions of the toolbar 100. In one embodiment, the dimension attribute may be the length of a toolbar component. In another embodiment, the dimension attribute may be the height of a toolbar component. In a further embodiment, the dimension attribute may be a cross-section length of a toolbar component. One skilled in the relevant art will appreciate that the dimension attribute may depend on the type of toolbar dimension adjustments that are inputted from the user.

At decision block 304, a test is conducted to determine whether the reference attribute value is between a maximum size threshold value and a first size threshold value. In an illustrative embodiment of the present invention, the maximum size threshold value corresponds to the largest value the reference attribute may have. The first size threshold value is a threshold value set to cause the toolbar components to change state from the first stage to the second stage, as will be described below. With reference to FIG. 3B, if the reference attribute value is between a maximum size threshold value and a first size threshold value, at decision block 306, a test is conducted to determine whether the toolbar component includes only a graphic representation. One skilled in the relevant art will appreciate that decision block 306 corresponds to a test whether the toolbar dimensions are being increased to transition the toolbar components from the second stage to the first stage. If the toolbar component includes only a graphic representation, at block 308, the textual representation is displayed and the dimensions of the graphic representation are reduced accordingly. Upon the restoration of the textual representation or if the toolbar component includes a textual representation at decision block 306, at block 310, the dimensions of the graphical representations are varied in accordance with user input.

In an illustrative embodiment of the present invention, the variance of the graphical representation will depend on the reference attribute value of the toolbar such that only a modification of the reference attribute value will result in a modification of the graphical representation. For example, in a horizontal toolbar embodiment, the reference attribute may the height of the toolbar components. Accordingly, a modification of the height results in a proportional modification of the dimensions of the graphical representation, while a modification of the width would not result in a modification of the dimensions of the graphical representation. Likewise, in a vertical toolbar embodiment, the width may be the reference attribute such that a modification of the width of the toolbar results in a modification of the dimensions of the graphical representation. Still further, in one embodiment of the present invention, a modification of the reference attribute results in a proportional modification of multiple attributes of the graphic representation (e.g., height and width).

In an additional embodiment of the present invention, the dimensions of the textual representations are maintained. In an illustrative embodiment of the present invention, routine 300 will remain in block 310 so long as the user manipulation maintains the reference attribute value within range. Once outside the threshold range, the routine 300 returns to decision block 304 (FIG. 3A).

Figure 4:
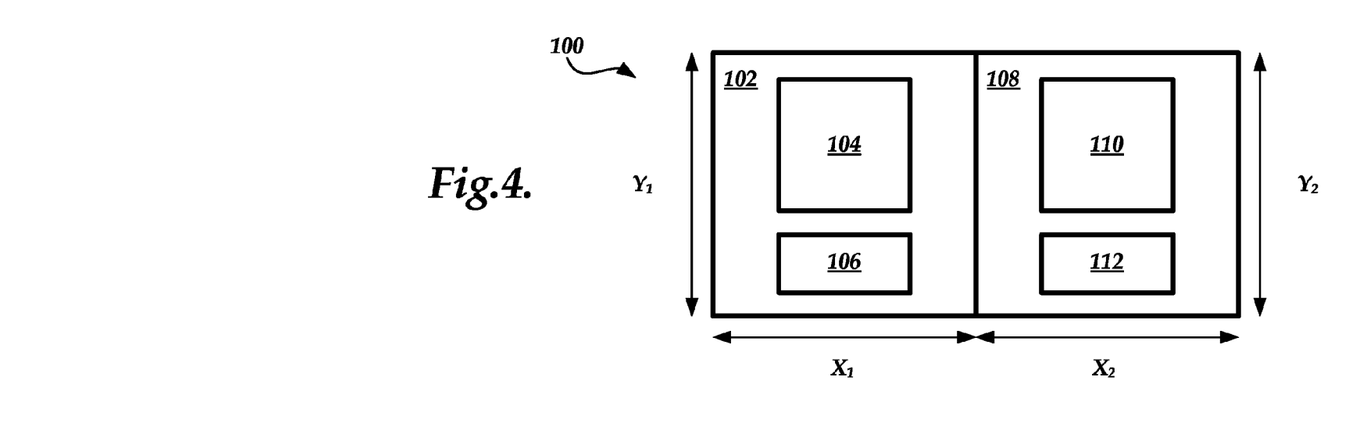
FIG. 4 is block diagram illustrative of a representative portion of a toolbar including two toolbar components each having a graphical representation and a textual representation in accordance with the present invention.
Figure 5:
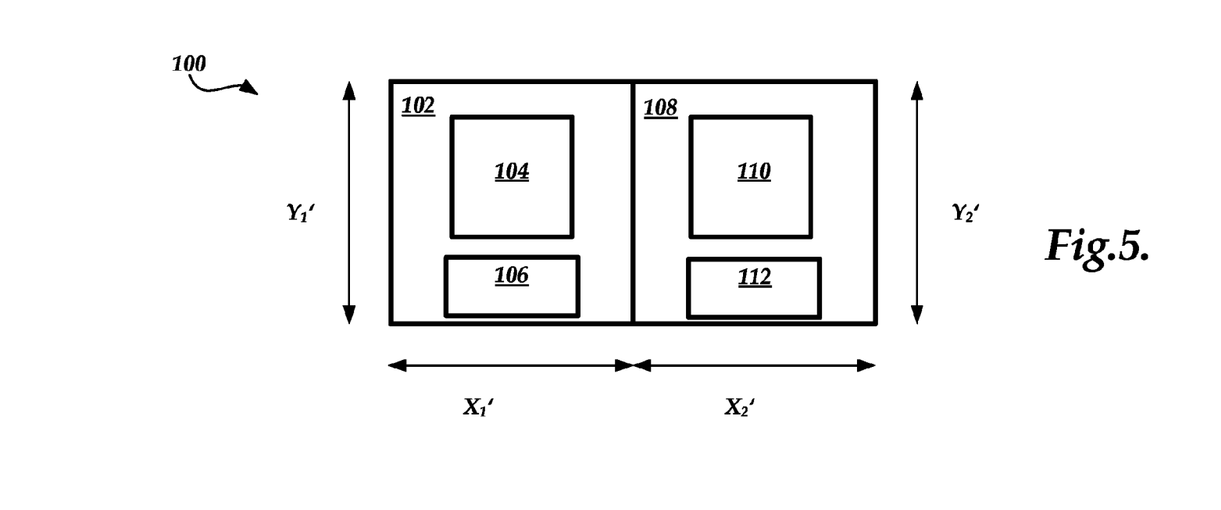
FIG. 5 is a block diagram of the toolbar of FIG. 4 illustrating the manipulation of the toolbar dimension between a maximum size threshold and a first size threshold in accordance with the present invention.

FIGS. 4 and 5 are block diagrams representative of a portion of the toolbar 100 illustrating two toolbar components 102, 108 in the first stage of toolbar dimension adjustment. In FIG. 4, the reference attribute value is between a maximum size threshold value and a first size threshold value. Accordingly, each toolbar component 102, 108 includes a graphical representation 104, 110 and a textual representation 106, 112. As the toolbar dimensions are manipulated, the dimensions of the textual representations 104, 100 are maintained, while the dimensions of the graphical representations 106, 112 are varied. With reference to FIG. 5, if the dimension of the toolbar is reduced, graphical representations 104, 110 are smaller, while textual representations 106, 112 remain the same size. Accordingly, the variation of the toolbar dimension appears only to cause the graphical representation to grow and shrink. Further, as illustrated in FIGS. 4 and 5, although the size of the toolbar components 102, 108 has grown smaller, the toolbar components remain adjacent by shifting the toolbar components as their dimensions are adjusted. In an illustrative embodiment of the present invention, animation techniques may be utilized during the shifting to keep the toolbar components adjacent.

With reference again to FIG. 3A, if the reference attribute value is not between a maximum size threshold value and a first size threshold value, at decision block 312, a test is conducted to determine whether the reference attribute value is between the first size threshold value and a second size threshold value. In an illustrative embodiment of the present invention, the base size threshold value corresponds to the smallest value the reference attribute may have. With reference to FIG. 3B, if the reference attribute value is between the first size threshold value and a second size threshold value, at decision block 314, a test is conducted to determine whether toolbar components include a graphical representation and a textual representation. One skilled in the relevant art will appreciate that decision block 314 corresponds to a test whether the toolbar dimensions are being reduced to transition the toolbar components from the first stage to the second stage or whether the toolbar dimensions are being increased to transition the toolbar components from a third stage (described below) to the second stage.

If the toolbar components include a graphical representation and a textual representation, the toolbar dimension is being decreased. At block 316, the textual representation is omitted from the display and the dimensions of the graphical representation are enlarged such that the graphical representation fills the space previously occupied by the graphical representation and the textual representation. In an illustrative embodiment of the present invention, the first threshold presents the point at which the size of the toolbar causes the display to change. At block 318, the dimensions of the graphical representation are varied proportional to the user input. As explained above, in an illustrative embodiment of the present invention, the variance of the dimensions of the graphic representation will be proportional to the variance of the reference attribute of the toolbar. If at decision block 314, the toolbar does not include a graphical and textual representation, the toolbar dimension is being increased. At block 316, the textual portion is omitted from the display and replaced with a graphical representation proportional to the current size of the toolbar component. At block 318, the dimensions of the graphical representation are varied proportional to the user input. Similar to block 310, routine 300 will remain in block 318 so long as the user manipulation maintains the reference attribute value within range. Once outside the threshold range, the routine 300 returns to decision block 304 (FIG. 3A).

Figure 6:
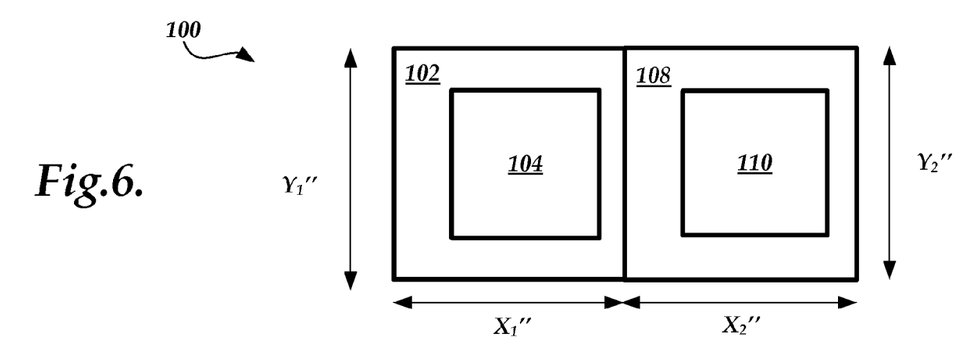
FIG. 6 is a block diagram of the toolbar of FIG. 5 illustrating the omission of the textual representation between the first size threshold and a second size threshold in accordance with the present invention.
Figure 7:
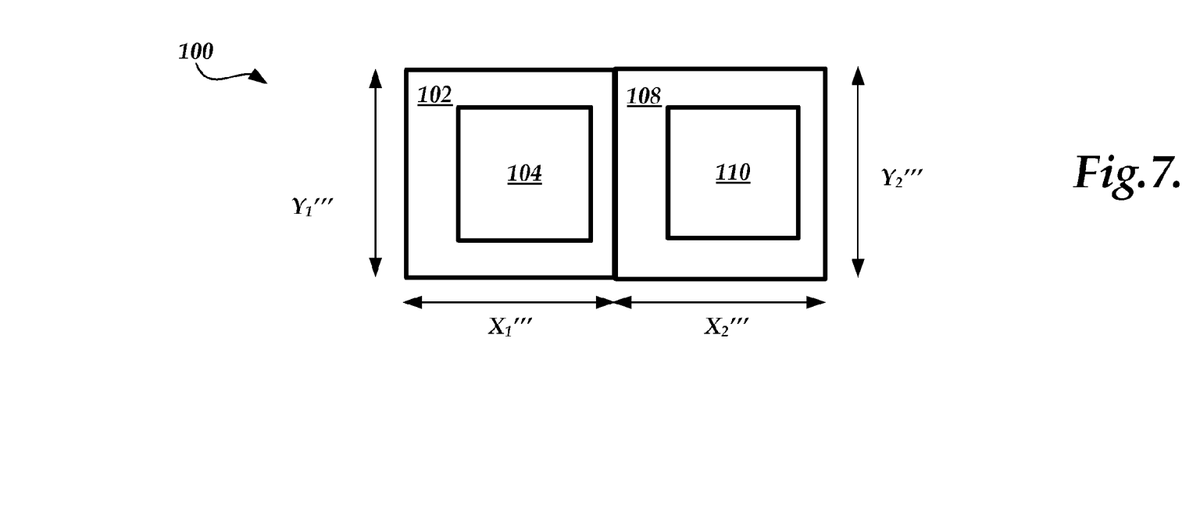
FIG. 7 is a block diagram of the toolbar of FIG. 6 illustrating the manipulation of the toolbar dimension between a first size threshold and a second size threshold in accordance with the present invention.

FIGS. 6 and 7 are block diagrams representative of a portion of the toolbar 100 illustrating two toolbar components 102, 108 in the second stage of toolbar dimension adjustment. In FIG. 6, the reference attribute value is between the first size threshold value and a second size threshold value. Accordingly, each toolbar component 102, 108 includes only the graphical representation 104, 110. The textual representation 106, 112 for each component has been omitted from the display. In an illustrative embodiment of the present invention, if the toolbar components are transitioning from the first stage, the dimension of the graphical representation 104, 110 will increase to conform to the current dimensions of the toolbar components 102, 108. As the toolbar dimensions are manipulated, the dimensions of the graphical representations 104, 110 are varied. With reference to FIG. 7, if the dimension of the toolbar is reduced, graphical representations 104, 110 are smaller. If the dimension of the toolbar is increased to exceed the first threshold, the toolbar components 102, 108 will transition to the embodiment illustrated in FIG. 5.

Figure 3C:
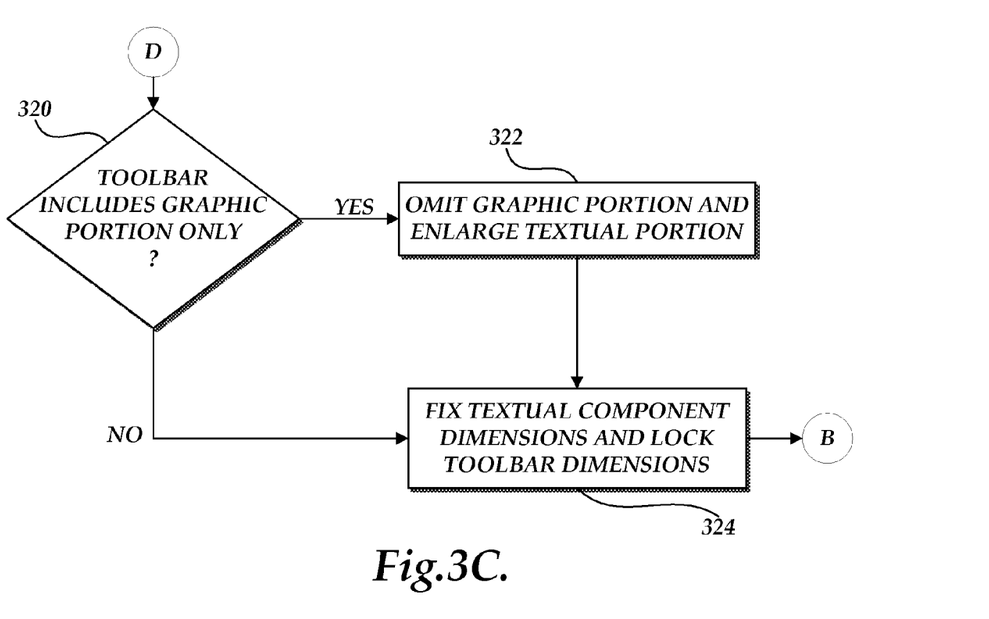

With reference again to FIG. 3A, if the reference attribute value is not between the first size threshold value and the second size threshold value, at decision block 320, a test is conducted to determine whether the reference attribute value is between the second size threshold value and a base size threshold value. The base size threshold value is a threshold value set to cause the toolbar components to change state from the second stage to a third stage, as will be described below. With reference to FIG. 3C, if the reference attribute value is between the second size threshold value and the base size threshold value, at decision block 322, a test is conducted to determine whether toolbar components include a only a graphical representation. One skilled in the relevant art will appreciate that decision block 322 corresponds to a test whether the toolbar dimensions are being reduced to transition the toolbar components from the second stage to the third stage.

If the toolbar components include only a graphical representation, the toolbar dimension is being decreased. At block 324, the graphic representation is omitted from the display and the textual representation is enlarged. In an illustrative embodiment of the present invention, the second threshold presents the point at which the size of the toolbar causes the display to change again. At block 326, in one embodiment of the present invention, the dimensions of the textual representation may be varied proportional to the user input. Alternatively, in the third stage, the dimensions of the textual representation may remain fixed and the reference attribute of the toolbar component cannot be adjusted further. If at decision block 322, the toolbar does not include only a graphical representation, the toolbar dimension is already in the third stage. Accordingly, the routine 300 proceeds to block 326, where the dimensions of the textual representation may varied proportion to the user input or are fixed as described above. Similar to block 310 and block 318 (FIG. 3B), routine 300 will remain in block 326 so long as the user manipulation maintains the reference attribute value within range. Once outside the threshold range, the routine 300 returns to decision block 304 (FIG. 3A).

Figure 8:
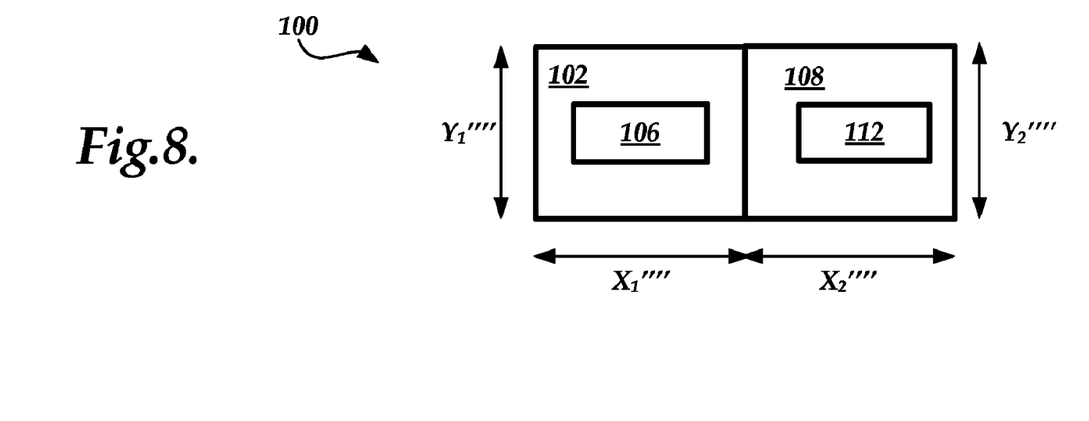
FIG. 8 is a block diagram of the toolbar of FIG. 7 illustrating the omission of the graphical representation between the second size threshold and a base size threshold in accordance with the present invention.
Figure 9:
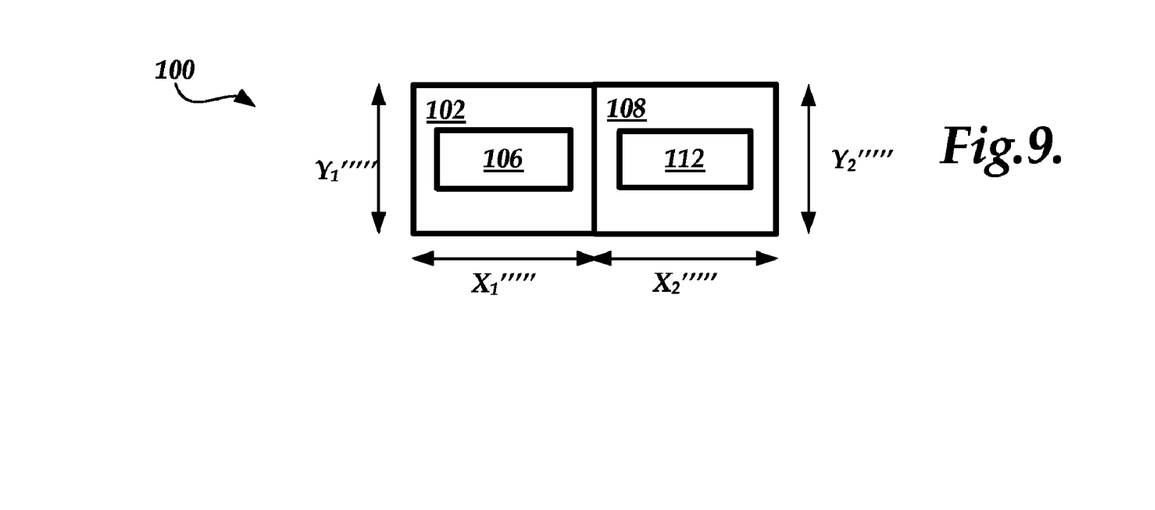
FIG. 9 is a block diagram of the toolbar of FIG. 8 illustrating the manipulation of the toolbar dimension between the second threshold and the base size threshold in accordance with the present invention.

FIGS. 8 and 9 are block diagrams representative of a portion of the toolbar 100 illustrating two toolbar components 102, 108 in the third stage of toolbar dimension adjustment. In FIG. 8, the reference attribute value is between the second size threshold value and a base size threshold value. Accordingly, each toolbar component 102, 108 includes only the textual representation 106, 112. The graphical representation 104, 110 for each component 102, 108 has been omitted from the display. In an illustrative embodiment of the present invention, if the toolbar components are transitioning from the second stage, the dimension of the textual representation 106, 112 will increase to conform to the current dimensions of the toolbar components 102, 108. As the toolbar dimensions are manipulated, the dimensions of the textual representations 106, 112 are fixed. In an alternative embodiment, the dimension of the graphical representations 106, 112 may be varied with the user input. If the dimension of the toolbar is increased to exceed the second threshold, the toolbar components 102, 108 will transition to the embodiment illustrated in FIG. 7.

With reference again to FIG. 3A, the routine 300 continues an iterative routine of processing user inputs to the toolbar dimensions. One skilled in the relevant art will appreciate that any number of additional thresholds may be added to create even additional stages for the toolbar components. Further, one skilled in the relevant art will appreciate that the omission of the textual representation in the second stage and the omission of the graphical representation in the third stage may be switched. Still further, a third representation may also be used during the transition from the second stage to the third stage.

While illustrative embodiments have been illustrated and described, it will be appreciated that various changes can be made therein without departing from the spirit and scope of the invention.

The invention claimed is:

1. In a computer system including a display and at least one user input device, a method for manipulating the dimensions of a toolbar, wherein the toolbar includes one or more toolbar components including a first representation and a second representation and wherein the toolbar is associated with at least one reference attribute, the method comprising:
    obtaining user input corresponding to a manipulation of the dimensions of the toolbar;
    obtaining a current reference attribute value for the toolbar;
    if the current reference attribute value for the toolbar is between a first size threshold and a second size threshold, displaying a first representation in each toolbar component and adjusting dimensions of the first representation relative to the user input, while maintaining the relative position of the toolbar components to each other and displaying the toolbar such that the adjusted first representation of each toolbar component is displayed; and
    if the current reference attribute value for the toolbar is not between the first size threshold and the second size threshold, displaying a second representation of each toolbar component and adjusting dimensions of the second representation relative to the user input, while maintaining the relative position of the toolbar components to each other and displaying the toolbar such that the adjusted second representation of each toolbar component is displayed.

2. The method as recited in claim 1, wherein the toolbar includes a graphical control for manipulating dimensions of the toolbar and wherein the user input is graphical user input device manipulation of the graphical control.

3. The method as recited in claim 1, wherein each toolbar component further includes a third representation, the method further comprising if the current reference attribute value for the toolbar is between the second threshold and a third threshold, displaying the third representation of each toolbar component and adjusting dimensions of the third representation relative to the user input.

4. The method as recited in claim 1, wherein the reference attribute is a length of each toolbar component.

5. The method as recited in claim 1, wherein the reference attribute is a height of each toolbar component.

6. The method as recited in claim 1, wherein if the current reference attribute value is between the first threshold and the second threshold, displaying the second representation and maintaining dimensions of the second representation.

7. The method as recited in claim 1, wherein if the current reference attribute value is between the first threshold and the second threshold:
    determining whether each toolbar component currently includes the first and second representations;
    if the toolbar component includes the first and second representations, for each toolbar component omitting the first representation and enlarging dimensions of the second representation to relative to a current dimension of the toolbar component.

8. The method as recited in claim 1, wherein if the current reference attribute value is between the first threshold and the second threshold:
    determining whether each toolbar component currently includes the first and second representations;

if the toolbar component does not include the first and second representations, for each toolbar component, omitting the first representation.

9. The method as recited in claim 1, wherein each representation is unique.

10. A computer-readable medium having computer-executable instructions for performing the method recited in claim 1.

11. A computer system including a display and at least one user input device, wherein the display includes a window having a toolbar including one or more toolbar components and a toolbar dimension control, wherein the each toolbar component includes a first identifier and a second identifier and wherein the toolbar is associated with at least one reference attribute, the system comprising:
   means for obtaining user inputs corresponding to manipulation of the toolbar dimension control;
   means for obtaining current reference attribute values for the toolbar;
   if the current reference attribute value for the toolbar is between a maximum size threshold and a first threshold, means for adjusting dimensions of the first identifier of each toolbar component relative to the user input while maintaining dimensions of the second identifier, while maintaining the relative position of the toolbar components to each other; and
   if the current reference attribute value for the toolbar is between the first threshold and a second threshold, means for adjusting the dimension of the second identifier of each toolbar component relative to the user input, while maintaining the relative position of the toolbar components to each other.

12. The system as recited in claim 11, wherein the reference attribute is a length of each toolbar component.

13. The system as recited in claim 11, wherein the reference attribute is a height of each toolbar component.

14. The system as recited in claim 11, wherein if the current reference attribute value is between the first threshold and the second threshold, the system further comprising:
   means determining whether each toolbar component currently includes the first and second identifiers;
   if the toolbar component includes the first and second representations, the system further comprising for each toolbar component means for omitting the first representation and enlarging the second representation to correspond to a current dimension of the toolbar component.

15. The system as recited in claim 11, wherein if the current reference attribute value is between the first threshold and the second threshold, the system further comprising:
   means for determining whether each toolbar component currently includes the first and second identifiers;
   if the toolbar component does not include the first and second representations, the system further comprising for each toolbar component, means for omitting the first representation.

16. The system as recited in claim 11, wherein if the current reference attribute value for the toolbar is between the second threshold and a third threshold, the system further comprising:
   means for determining whether each toolbar component currently includes the second identifiers; and
   if each toolbar component currently includes only the second identifier, the system further comprising means for omitting second identifier, adding the first identifier and enlarging the first identifier to a current dimension of each toolbar component.

17. A tangible computer-readable storage medium bearing computer-executable instructions which, when executed on a computing device having a processor, a memory, a user input device, and a display device, configure the computing device to carry out a method for manipulating the dimensions of a toolbar on the display device, wherein the toolbar includes a plurality of toolbar components, each toolbar component having a first representation and a second representation, wherein the toolbar is associated with at least one reference attribute, the method comprising:
   obtaining user input from the user input device corresponding to a manipulation of the dimensions of the toolbar;
   obtaining a current reference attribute value for the toolbar;
   if the current reference attribute value for the toolbar is between a first size threshold and a second size threshold, outputting for display to the display device a first representation in each toolbar component and adjusting dimensions of the first representation relative to the user input, while maintaining the relative position of the toolbar components to each other and outputting for display to the display device the toolbar such that the adjusted first representation of each toolbar component will be displayed; and
   if the current reference attribute value for the toolbar is not between the first size threshold and the second size threshold, outputting for display to the display device a second representation of each toolbar component and adjusting dimensions of the second representation relative to the user input, while maintaining the relative position of the toolbar components to each other and outputting for display to the display device the toolbar such that the adjusted second representation of each toolbar component will be displayed.

* * * * *